United States Patent [19]

Boyle

[11] 4,247,985
[45] Feb. 3, 1981

[54] TFL CALIPER

[75] Inventor: William G. Boyle, Dallas, Tex.

[73] Assignee: Otis Engineering Corporation, Dallas, Tex.

[21] Appl. No.: 54,222

[22] Filed: Jul. 2, 1979

[51] Int. Cl.³ .............................. G01B 5/12; G01B 5/28
[52] U.S. Cl. ..................................................... 33/178 F
[58] Field of Search ........................................ 33/178 F

[56] References Cited

U.S. PATENT DOCUMENTS

| | | | |
|---|---|---|---|
| 2,518,663 | 8/1950 | Chaney et al. | 33/178 F |
| 2,567,548 | 9/1951 | Chaney et al. | 33/178 F |
| 2,596,924 | 5/1952 | Fredd | 33/178 F |
| 2,708,316 | 5/1955 | Fredd | 33/178 F |
| 2,789,357 | 4/1957 | Schramm | 33/178 F |
| 2,879,604 | 3/1959 | Chaney et al. | 33/178 F |

Primary Examiner—Richard R. Stearns
Attorney, Agent, or Firm—Vinson & Elkins

[57] ABSTRACT

A "feeler" type caliper for through the flow line (TFL) use in wells for indicating and recording maximum radius within the well flow conductor. The caliper has an improved arrangement of feelers and springs for centering the caliper within the well flow conductor and is articulated to pass through a five-foot radius loop. The caliper comprises a drive mechanism housing a plurality of drive wheels which track the inside of the tubing in a helical path; a sensing mechanism housing a plurality of spring loaded feeler arms which, when the caliper travels upward in the well flow conductor, are in a biased touching relation to the bore wall of the well flow conductor, each being free to be urged outwardly into recesses in the bore wall of the well flow conductor, such outward travel being sensed in a recording mechanism, the recording mechanism being operated by said drive mechanism to record maximum inside radius of the well flow conductor, versus distance traveled along the well flow conductor.

6 Claims, 11 Drawing Figures fig.1 fig.6 fig.2A fig.2B fig. 2C fig. 2D fig.2E fig.3 fig.4 fig.5A fig.5B

TFL CALIPER

BACKGROUND OF THE INVENTION

1. Field of the Invention

This invention is related to feeler-type mechanical calipers for measuring and recording irregularities in the inner wall of well flow conductors. More particularly, the invention relates to TFL calipers.

2. Prior Art

Calipers have been used for many years as part of an overall effort at detecting and controlling corrosion in oilfield pipe, including both tubing and casing. There are several mechanical and electronic types of calipers available that accomplish the task of determining imperfections in pipe. Some have very specific limitations in their application. For example, within the field of "electronic" calipers, two such devices utilize coils to sense either a magnetic field (magnetic caliper) or an eddy current phase shift between an exciter coil and a detector coil (eddy current).

The present invention is within the field of "feeler" type mechanical calipers and utilizes a plurality of feelers held within a sensing mechanism. The feelers are spring loaded and are biased against the bore wall of well flow conductors such as flow lines and well tubing to travel thereinto, and detect, pits and other imperfections in the wall. To date, these calipers have generally been confined to "wireline" operations. That is to say, the drive mechanism, recording mechanism and sensing mechanism have been housed in a single unit. This has always been the result of the inherent difficulty of centering the sensing mechanism within the tubing and because the drive mechanism was connected, directly through a drive shaft, to the recording mechanism making it extremely difficult to separate the caliper into individual units. Of course, to be useful in TFL operations, the entire mechanism must be articulated for passage through a severe bend in the flow conductor for vertical entry into the tubing from a horizontal flow line. A standard, long-ago adopted by the industry, requires that the radius of such bends be no less than a 5 foot radius.

Pertinent patents in this field include the Chaney et al U.S. Pat. No. 2,518,663 which discloses and claims a caliper having a sensing section having a housing and a plurality of independently movable feelers spaced circumferentially of said housing and adapted for independent lateral movement between the housing and the tube wall being calipered. Other important features claimed therein have been widely used in the industry since issuance of the patent.

A subsequent Chaney et al U.S. Pat. No. 2,879,604, taught that it was possible to individually record the lateral movement of individual feeler arms in the sensing section of the caliper. To utilize this device, however, it was necessary to use electrical line to lower and retrieve the caliper in the well. The feeler arm mechanism, however, was essentially that claimed previously in the No. '663 patent.

Another Chaney et al Patent in this field is U.S. Pat. No. 2,567,548, which claims a caliper having a rotative and axially movable chart for recording deviations in the inside diameter of a pipe.

SUMMARY OF THE INVENTION

A through the flow line caliper for detecting irregularities in flow conduit geometry by measuring and recording irregularities in the bore wall of a well flow conductor comprising: an articulated housing having a plurality of segments, including: a first segment, a plurality of feeler means housed therein and extendable radially therefrom engagable with the bore wall of said well flow conductor, resilient urging means associated with each of said feeler means, each feeler means being independently extendable to sense an increase in the radius of said well flow conductor bore wall; a second segment, recording means housed therein responsive to extension of each said feeler means sensing an increase in the radius of said well flow conductor bore wall, and chart means associated with said recording means for graphically recording said sensed increase in the radius of said well flow conductor bore wall, a lead screw axially traversing said second segment and extending into a portion of said first segment, the recording means being carried on said lead screw, the portion of said lead screw just entering said first segment being flexible whereby bending of said articulated housing occurring at the junction of said first and second segments causes bending of said portion of said lead screw, and a drive frame for rotating said recording means; drive means operably connected to said drive frame and engagable with the bore wall of said well flow conductor, for driving said drive frame as the caliper moves in a direction toward the entry point of the well flow conductor.

It is one object of this invention to provide a self-contained caliper which is pumpable through or into and back out of flow conductors and movable through the bends in such flow conductors as normally found at pumpdown installations.

Another object is to provide a caliper such as that just described wherein the caliper is composed of articulated sections connected together by flexible joints.

A further object is to provide a flexible caliper for pumping through flow conductors having bends therein of no lesser radius than those normally found in pumpdown installations, said flexibility being provided by pivotally connecting adjacent segments of the caliper.

It is an object of the invention to provide a caliper that can sense and graphically record the maximum radius of a well flow conductor bore using through the flow line (TFL) procedures.

It is a further object to provide an articulated TFL caliper for determining the maximum radius of a well flow conductor bore.

It is another object of the invention to provide means to mechanically record the maximum radius of a well flow conductor bore using the articulated TFL caliper.

Another object of the invention is to provide suitable means on said articulated TFL caliper to prevent recordation of maximum radius of the well flow conductor bore while the TFL caliper is traversing the well flow conductor in a direction away from the flow conductor entry point.

It is a primary object of this invention to additionally provide an articulated TFL caliper having a lead screw extending into at least two connected segments of the caliper which is sufficiently flexible to permit the angular flexure of the articulated joint, through which the lead screw passes, required in moving the caliper through well flow conduits having bends such as those commonly found in TFL installations.

BRIEF DESCRIPTION OF THE DRAWINGS

The above and other objects, advantages and features of the invention will become more apparent upon consideration of the following specification, taken in connection with the accompanying drawings, wherein.

DESCRIPTION OF THE PREFERRED EMBODIMENTS

Figure 1:
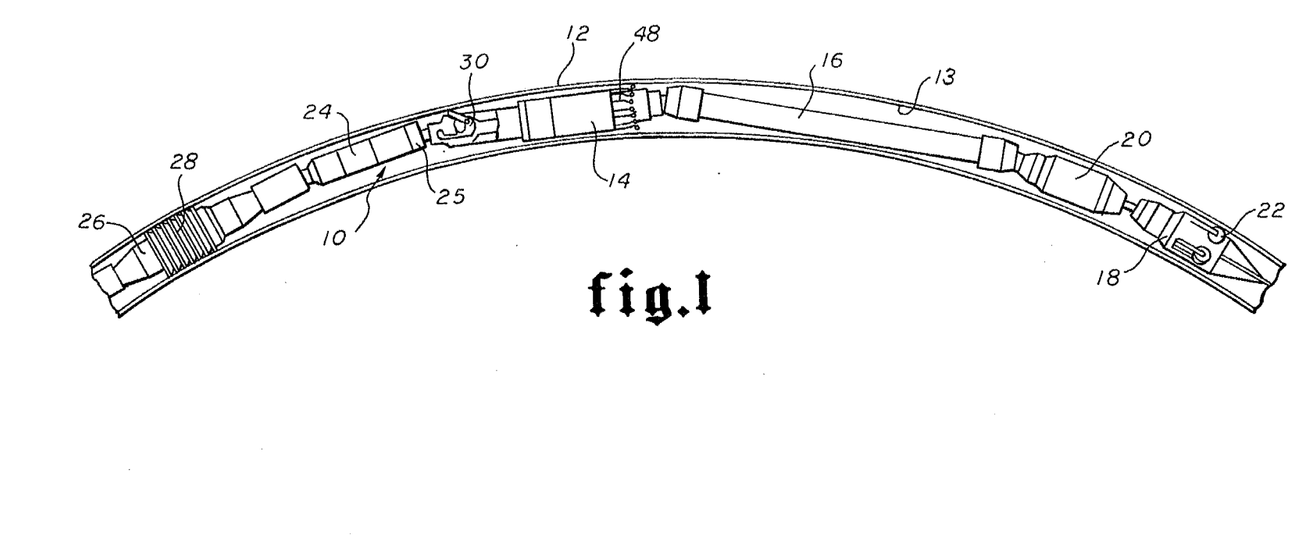
FIG. 1 is a cross-sectional schematic view of a portion of a TFL loop with the articulated TFL caliper positioned therein.

In FIG. 1 there is illustrated a portion of an entry loop 12 to a flow line, in cross-section, revealing the articulated TFL caliper 10 positioned in the bore 13 thereof. The schematically depicted caliper 10 is shown to have a plurality of segments. As illustrated, the bore 13 radius is sensed by feeler arms 48 having contacts 49 engagable with the tubing bore wall 13, with the feeler arms housed in a first segment 14 of the caliper 10. The first segment 14 has a mechanism 30 to permit the caliper 10 to go down the well with the feeler arms 48 retracted in the segment 14. When the caliper 10 begins its upward movement in the well or in the flow line 12 toward the well entry point the feelers 48 are released and extended radially from the segment 14 and engage the well or tubing bore wall 13. The mechanism that accomplishes this function is a snap-over-center toggle 30 located on the end of the segment 14 opposite the feeler arms 48. This first segment 14 may be hereinafter referred to as the "sensing section" of the articulated TFL caliper 10.

A second segment 16 is connected to the sensing section 14 by way of a knuckle joint, best illustrated in FIG. 2B, which will be more fully described hereinafter. The second segment 16 may be referred to hereinafter as the "recording section" of the caliper 10, and is best illustrated in FIGS. 2B-D. The general function of the recording section 16 is to record on a chart housed therein the pits 15 and other defects in the tubing bore wall 13 which are usually manifestations of corrosion and the like, which are sensed by the feeler arms 48 of the sensing section 14. The chart 101 (shown in FIGS. 2C-D) used by the inventor is preferably a coated metal that is inserted into the housing 92 of the recording section 19. A hard pointed, spring loaded needle or stylus 102, carried on a stylus holder 104, scribes the chart line (not illustrated). The stylus holder 104 is threaded onto a lead screw 72 (see FIGS. 6 and 2B-D), which carries the stylus holder 104 axially within the recording section housing 92. While the lead screw 72 does not rotate, it does have reciprocal motion caused indirectly by a feeler arm 48 traveling radially into a pit 15 or other depression in the tubing bore wall 13. Thus, movement of the lead screw 72 causes a corresponding movement of the stylus holder 104 and stylus 102, causing such movement to be recorded on the coated metal chart 101.

Connected to the recording section 16 is the drive mechanism segments 20 and 18, successively. That portion of the drive mechanism 20 connected directly to the recording section 16 comprises a gear box 20, as shown in detail in FIG. 2D, and includes a clutch therewith to inactivate the recording section 16 while the caliper 10 is traveling away from the well flow line 12 entry point.

The drive mechanism segment 18 is connected next in line, to the gear box/clutch segment 20, and houses a plurality of wheels 22 which provide a helical drive assembly 18 for operating the recording section 16. A more detailed discussion of the operation and construction of the helical drive assembly 18 is provided hereinafter.

Figure 2A:
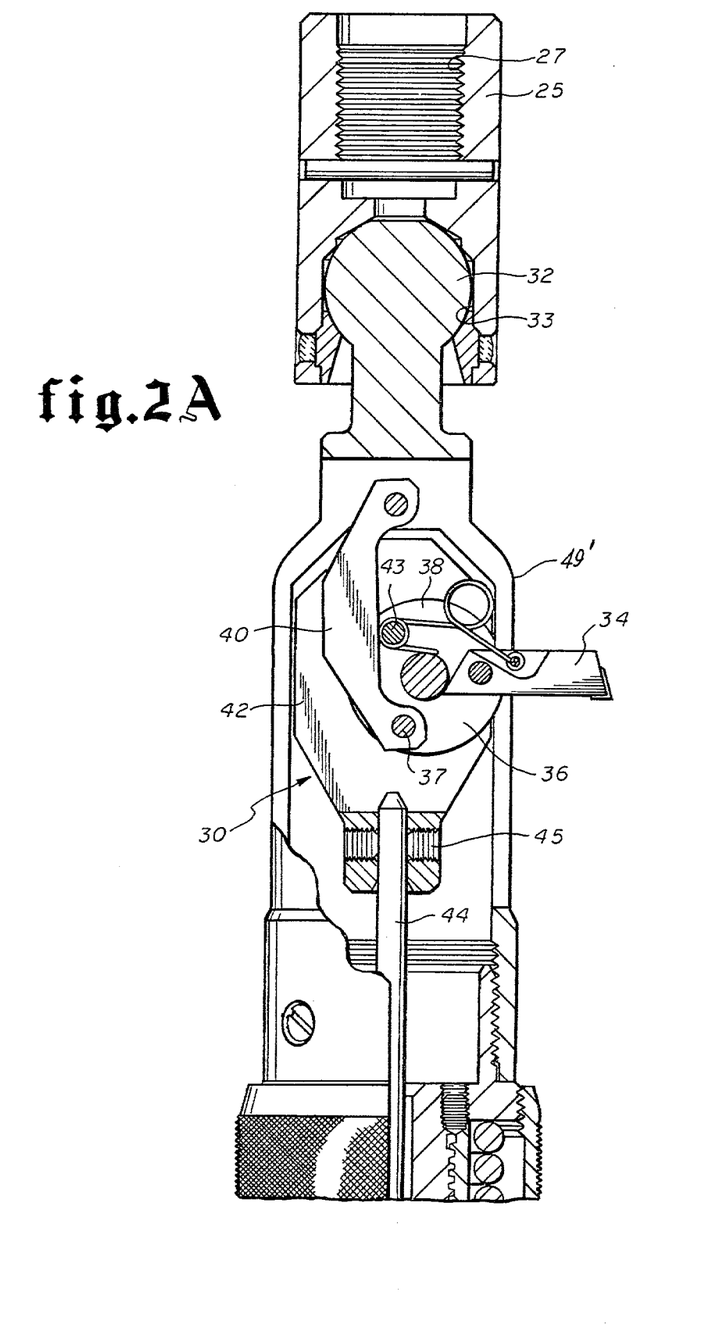
FIGS. 2A-D are elevational drawings, partly in cross-section and partly in quarter-section, illustrating the articulated TFL caliper of the invention.
Figure 2B:
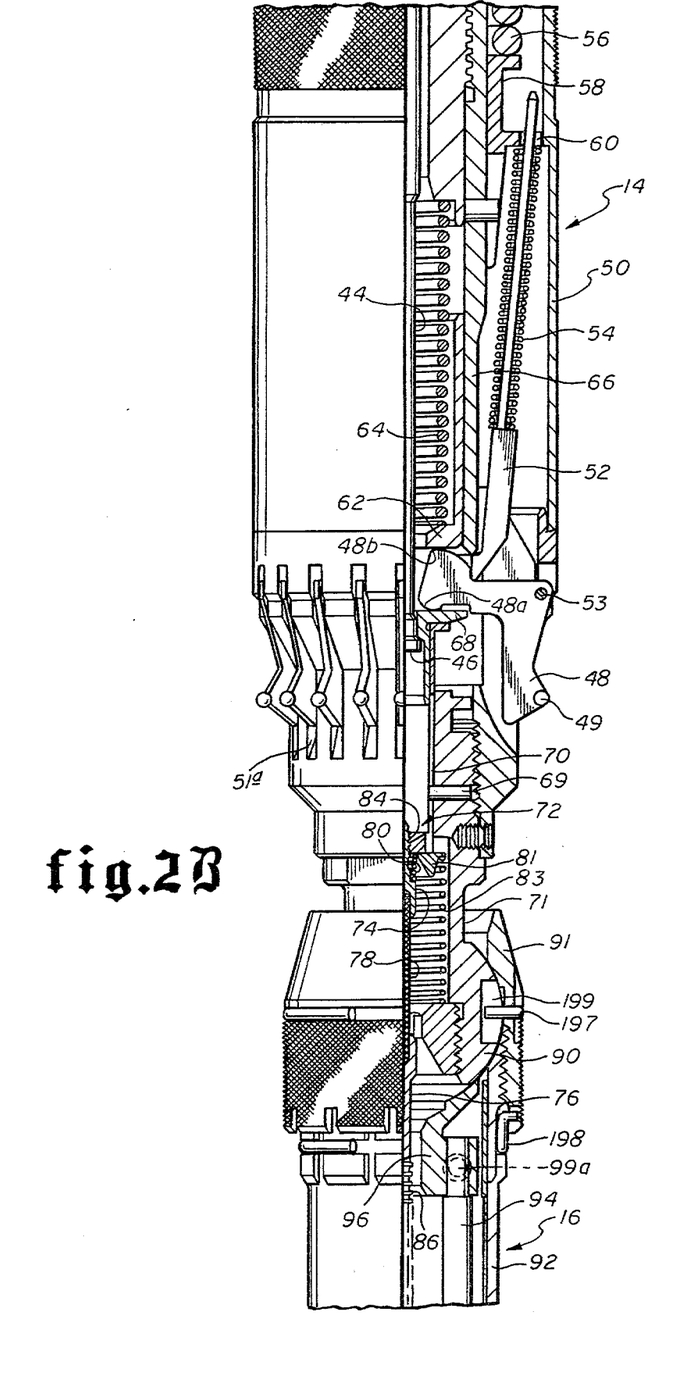
Figures 2C, 2D:
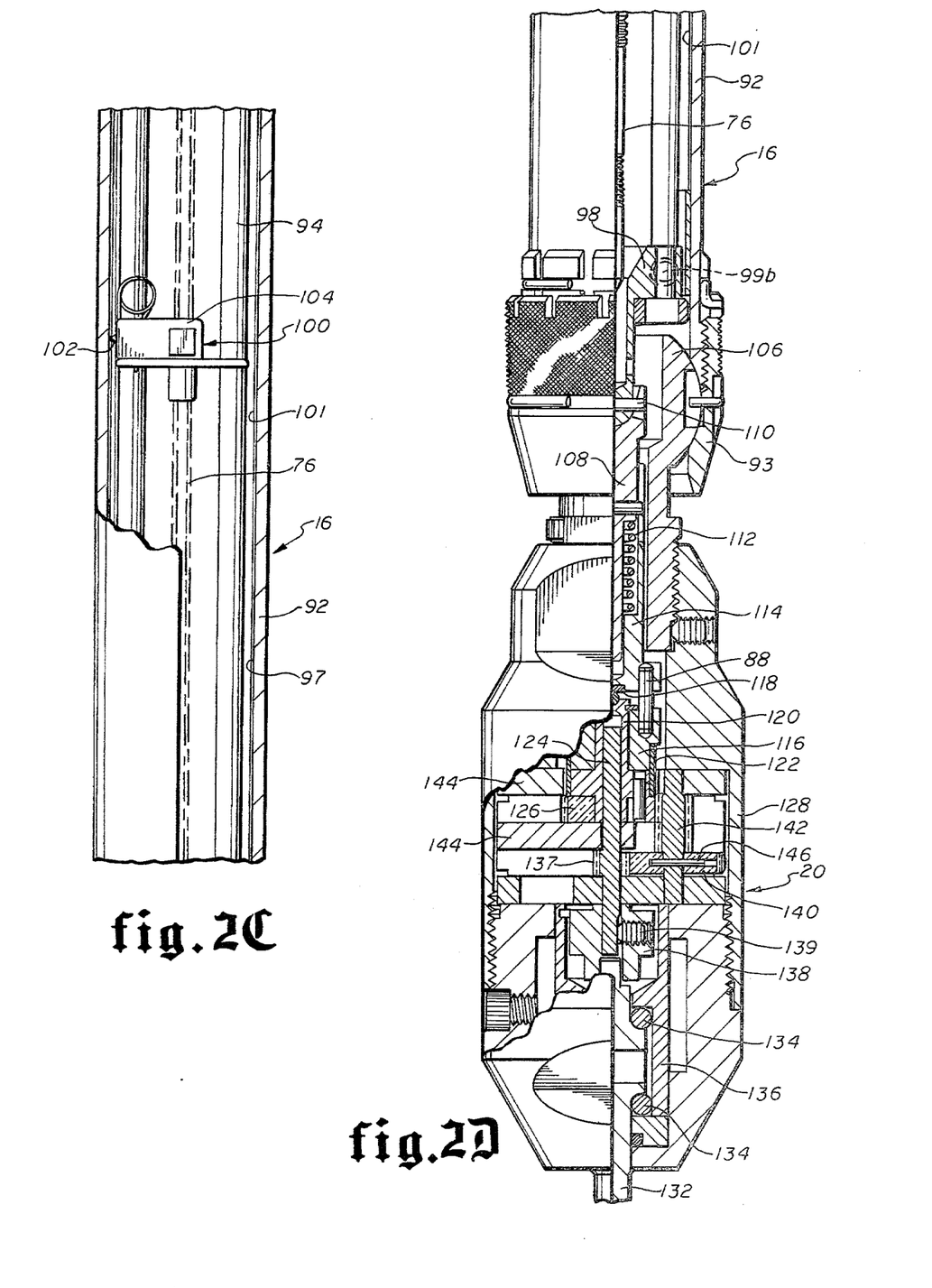

For a detailed description of the articulated TFL caliper, reference is made to FIGS. 2A through E, particularly to FIG. 2B, wherein a major portion of the sensing section 14 is shown. The sensing section 14 consists of a housing member 50 threadedly connected to a subassembly 49' housing the snap-overcenter toggle mechanism 30. The subassembly 51 has on one end thereof a ball member 32 securable in a socket 33, forming a knuckle joint, as shown in FIG. 2A. The socket 33 is formed on a member 25 threadedly 27 connectable to means 24 for carrying the caliper 10 in and out of the well, using TFL flow members 26 having means 28 for sensing flow in the tubing.

Within the housing 50 there are a plurality of feelers 48, each of which is individually radially extendable through slots 51a in the housing 50. The feelers 48 are spring loaded by individual feeler springs 54 mounted on spring guides 52 which are in turn in constant contact with the feelers 48 at a point adjacent the heel portion 48b of said feelers 48. The feeler springs 54 are kept in a biased position by being in contact with a guide ring 58. The guide ring 58 is a concentric ring positioned circumferentially around the feeler arm body 66 which is positioned on a central axis of the housing 50.

The guide ring 58 is longitudinally movable along the length of the feeler arm body 66, and the collective force of the plurality of feeler springs is opposed, on the opposite side of the guide ring 58, by a compensator spring 56 which is confined within the housing 50. The compensator spring 56 maintains a more constant feeler spring 54 load. The feeler springs 54 are designed to provide a high rate, in pounds per inch, to aid in maintaining the caliper sensing section 14 in a bore centered position. This is particularly important in a calipering instrument which samples tubing using the maximum radius approach.

A tubular feeler arm body 66, disposed in the sensing section housing 50, has housed therein a centering spring 64 which acts on a centering plunger 62 held in the feeler arm body 66. While traveling into the well tubing to begin calipering, the feelers 48 are held in a retracted position, not in contact with the tubing bore.

This is accomplished by means of a release rod 44 extending from the snap-over-center toggle mechanism 30 down through the center of the sensing section housing member 50 and being in retaining engagement with a stylus rod cap 68 contacting the toe portion 48a of the feeler 48. With the release rod 44 in its retracted position, as shown in FIG. 2B, the centering spring 64, compensator spring 56 and feeler springs 54 are all compressed.

Figure 5A:
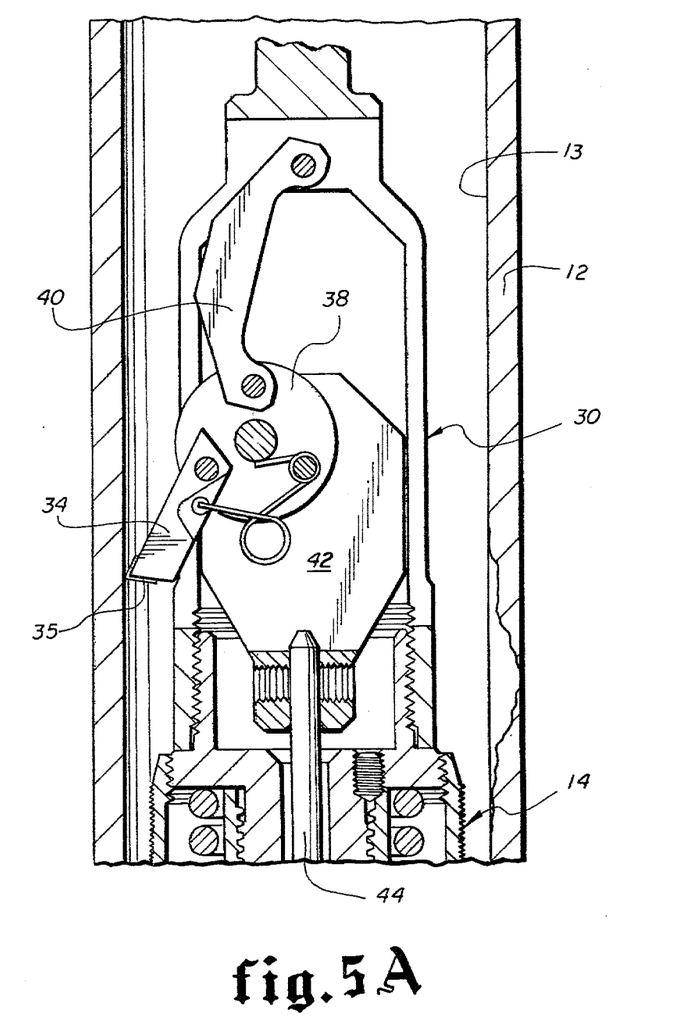
FIGS. 5A-B are elevational views, in cross-section, illustrating the feeler arms engaged with a pit in the tubing bore wall and with the feeler arms extended to be engaged with the tubing bore walls.
Figure 5B:
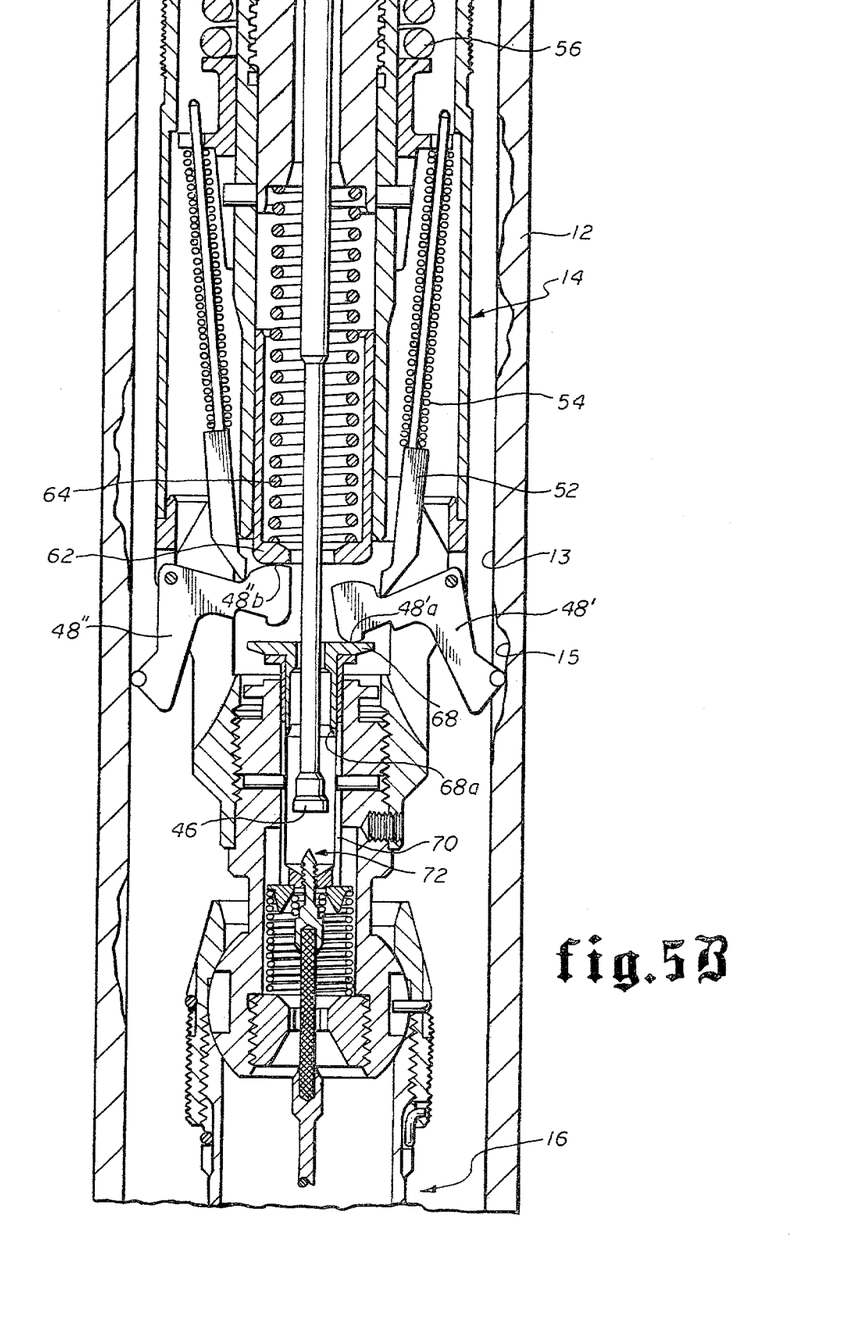
Figure 6:
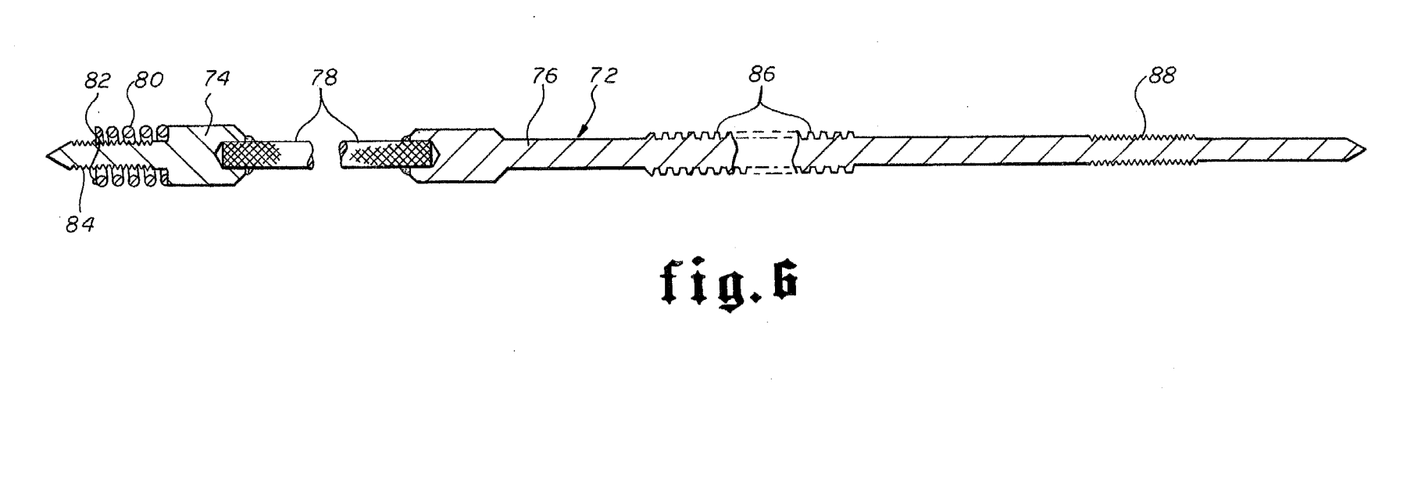
FIG. 6 is a plan, cross-sectional view of the lead screw illustrating the flexible portion thereof.

In FIG. 5B, the release rod 44 is shown in its extended position and the above spring members 64, 56 and 54 have been released to act upon the feelers 48. In addition, FIG. 5B illustrates the relative positions of two feelers 48' and 48" where one feeler 48' is sampling an indented site 15 in the tubing bore wall 13. The centering plunger 62 is maintaining a biased contact with a heel portion 48"b of the feeler 48" to maintain the less-extended feelers (represented here by feeler 48") in a biased relation to the "normal" radius of the tubing bore wall. This provides a constant centering action on the sensing section 14 and provides for much greater accuracy in interpreting the stylus tracings on the chart member 101.

The radial movement of the feeler 48 is translated to a tracing on the chart member 101 by longitudinal movement of the lead screw 72 carrying the stylus holder 104 and stylus 102.

The lead screw 72, as discussed above, is housed principally in the recording section 16. However, it is illustrated in FIG. 2B to extend for a relatively short distance into the sensing section 14. Because the TFL caliper must bend at the point where the lead screw enters the sensing section 14, a portion 78 of the lead screw 72 is flexible and capable of bending through the same angle as the TFL caliper 10, itself. The connector screw portion 74 of the lead screw 72 is the part of the lead screw 72 actually connected to the sensing section 14. A left handed thread 84 is provided on the connector screw 74 for providing a threaded connection to stylus rod 70. The stylus rod 70 utilized in the invention is essentially a tubular member disposed along the central axis of the sensing section 14, which reciprocates but does not rotate, rotation being prevented by a pin 69 extending through the stylus rod bushing 71 and engaged in a slot in the stylus rod 70.

A stylus rod cap 68 positioned on the end of the stylus rod 70, is in contact with all feelers 48 when they are held in the retracted position, shown in FIG. 2B, held by the release rod 44. However, when the release rod 44 has been extended, as shown in FIG. 5B, the stylus rod cap 68 is in contact with only the feeler 48' extended to the greatest radius of the tubing bore. The toe portion 48'a is then the contact point with the stylus rod cap 68 and causing longitudinal movement of the lead screw 72 through the stylus rod 70.

A counteracting force resisting this longitudinal movement of the stylus rod 70 (and lead screw 72 connected thereto) is provided by a stylus return spring 83 housed in the stylus rod bushing 71. By design, in the present invention, the feeler springs 54 must exert more torque on the feeler 48 than does the stylus return spring 83, even though the stylus return spring 83 pushes at a greater radius. This dictates that the stylus return spring 83 must be relatively weak. While this tends to cause some over-travel problems with the stylus 102, the effect is well compensated for by filling the recording section housing 92 with a viscous fluid, such as SAE 90 oil. This tends to dampen the travel rate of the stylus holder 104 so that the abrupt stop in the radial movement of the feeler 48, when it reaches the bottom of the depression 15 in the tubing bore wall 13, is more properly sensed and recorded in the recording section 16.

Because there is considerable vibration in the caliper 10 as it traverses the flow line and tubing, a small spring 80 is provided in a recess in the connector screw 74 of the lead screw 72 (the recess in fact being the threaded end 84 portion of the connector screw 74). When the connector screw 74 is screwed into the end of the stylus rod 70, the spring 80 places tension on the threaded connection, reducing the likelihood that the lead screw 72 will be vibrated loose from the stylus rod 70. A small protrusion 82 from the leading edge of spring 80, when engaged against the end of the stylus rod 72, assists in this locking effect.

Feeler 48 radial extension is recorded on the coated metal chart 101 retained in the recording section 16, as discussed generally, above. The hard needle, or stylus, 102 is carried on the stylus holder 104 traveling longitudinally in the recording section housing 92 along the length of the lead screw (76) threads 86. The stylus 102 scribes a generally helical line on the chart 101. In order to produce the helical line, the stylus holder 104 travels the length of the lead screw threads 86 as it rotates due to the threaded engagement. The rotation is imparted to the stylus holder 104 by means of a drive frame 94 comprising at least two rod members which are connected to the drive mechanism 18 through the clutch/gear mechanism 20. These rods of the drive frame 94 run axially in the housing 92 parallel to the lead screw 72. The rod ends nearest the sensing section 14 are connected to an upper end plate 96.

The upper end of the drive frame rods are secured in the upper end plate 96 by set screws 99a, and in like manner, the lower ends of the rods of drive frame 94 are connected to drive plate 98 and secured thereto by set screws 99b, as shown in FIGS. 2B and 2D. The drive frame rods 94 extend through holes in the stylus holder 104 and as the drive frame 94 is rotated in the housing 92, the stylus holder 104 is rotated about the lead screw.

While the ball 90 swivels within the knuckle joint connecting the sensing section 14 and the recording section 16, the recording section housing 92 is prevented from rotating on the ball 90 by placement of a key ring 197 around the swivel cap 91. The key ring 197 has a tang projecting into the swivel cap 91 and into a slot 199 in the ball 90. This prevents rotation of the recording housing 16. A lock ring 198 secures the swivel cap 91 to the recording section housing 92.

A similar arrangement of lock ring and key ring is used on the lower end of the recording housing to secure the swivel cap 93 to the housing 92. In order to disconnect the recording section housing 92, it is necessary to first lift out the tang of key ring 197 from the hole in the swivel cap 91. Next, lift tang of lock ring 198 out of the slots in the swivel cap 91 and housing 92. This unkeys the swivel cap 91 from housing 92. Next, unscrew the swivel cap 91 from the housing 92 without rotating the stylus rod bushing 71 relative to the housing 92.

The drive plate 98 is powered by the rotation of the drive mechanism 18 rotating as the TFL caliper 10 is moved up the well tubing. As mentioned previously, a plurality of tilted, grooved wheels 22 carried on load arms 152 connected to the drive carriage 18 track a helical path inside the tubing bore.

The wheels 22, held by load arms 152 are held in contact with the tubing bore 13 by the action of a spring 156, disposed in a recessed bore of the drive mechanism housing 150. The spring 156 is biased against a ring 158 which is a part of the loading plunger 154 axially disposed in the drive mechanism housing 150 inside the concentric spring 156. The spring 156, biased against the ring 158 acts upon the load arm heel 160 to bias the load arm 152 and the wheel 22 radially from the housing 150.

Figures 2E, 3:
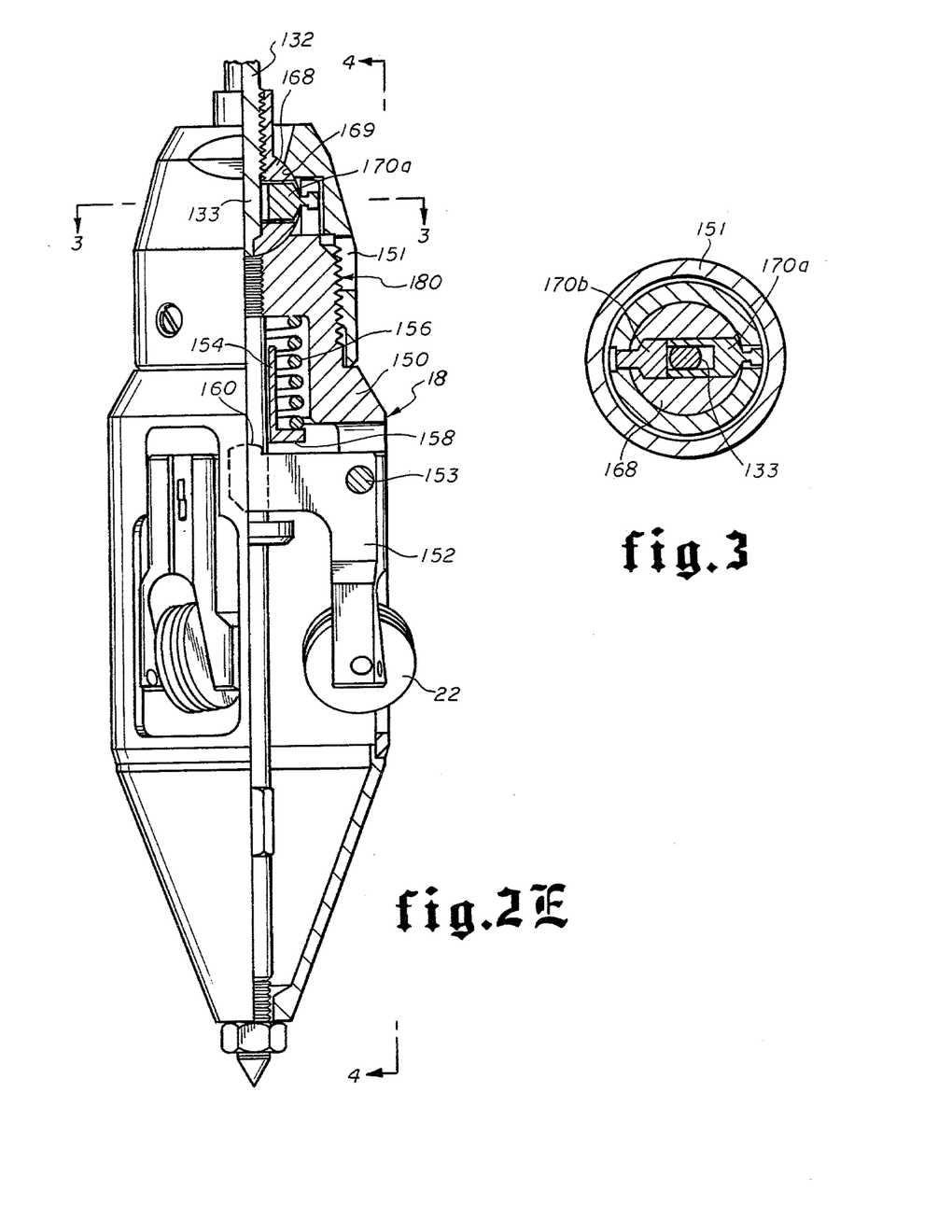
FIG. 2E is an elevational view, in quarter-section illustrating the drive mechanism of the articulated TFL caliper of the invention.
FIG. 3 is a cross-sectional view taken through the driving universal joint of the drive mechanism of the articulated TFL caliper, the view being taken on the line 3—3 of FIG. 2E.
Figure 4:
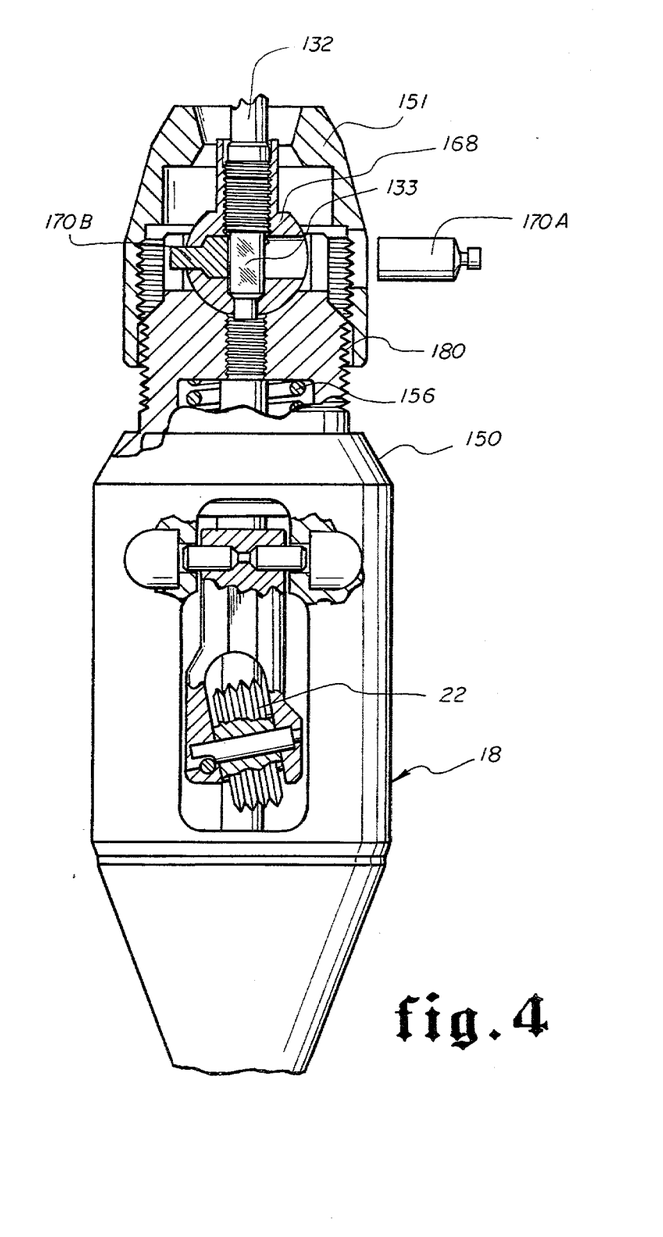
FIG. 4 is an elevational view partly in cross-section to reveal the driving universal joint of the drive mechanism of the invention, the view being taken along the view line 4—4 of FIG. 2E.

A drive shaft 132 extends from the upper end of the drive mechanism housing 150 and swivel housing 151 and enters the gear housing 128, as illustrated in FIGS. 2D and E. Torque is imparted to the drive shaft 132 by an arrangement consisting of a flatened portion 133 of the drive shaft 132, passing through a universal ball 168, being secured by slotted key pin 170a being fitted over the flat portion 133. A lug 170b opposes the key pin 170a legs passing on each side of the flat portion 133 of the drive shaft 132. This is best illustrated in FIG. 3.

The universal ball is housed in the drive shaft 132 exit end of the drive mechanism housing 150 and is retained by a bearing surface 169 in the bore of the swivel housing 151 threaded 180 onto the drive mechanism housing 150.

Rotation of the drive shaft 132 is imparted to a pinion 124, axially disposed in the gear housing 128, coupled thereto by a drive coupling 138. A set screw 139 inserted through the drive coupling 138 holds the pinion 124 securely therein. The other end of the pinion 124 is received into the bore of a clutch gear 120, forming a part of the clutch arrangement. The clutch permits the TFL caliper to be run into a well or flow line without the drive frame 94 being operably engaged. The drive shaft 132 rotates while the caliper travels in either direction. A helical winding, referred to herein as a clutch spring 122, is wound around the clutch drum 116. The clutch is designed to be rather loosely fitted so that on the trip into the well the clutch spring 12 is non-binding on the clutch drum 116 as the clutch drum rotates in a clockwise direction. However, traveling out of the well, the drum 116 rotates in the opposite direction, causing the clutch spring 122 to bind to the clutch drum 116, engaging clutch gear 120 and thus driving coupler 114 and universal 108 pinned 110 to the drive plate 98 of the recording section 16.

In a preferred embodiment of the invention, a bushing 118 is provided on the end of the coupler 114 contacting the clutch gear 120, forming a thrust bearing. A pin 88 also extends between the coupler 114 and the clutch drum 116.

Pinion gear teeth 137 are engaged with a drive gear 140 which is the driving means for the gear shaft 142 pinned 146 thereto, housed in the gear housing 128. The gear 126, driven by the drive gear 140, via the drive shaft 142, is pinned to the clutch gear 120. The gear 126 is disposed between the two sections of the gear cage assembly, as illustrated in FIG. 2D.

As can be appreciated, the above description of the invention is directed principally to the preferred embodiments thereof. Many variations can be made in the gear assembly, clutch mechanism, drive mechanism and the like, to accomplish the same purposes without departing from the scope of the invention. However, the protection to which the inventor is entitled is determined by the claims appended hereto, as follows.

What is claimed is:

1. A through the flow line (TFL) caliper for measuring and recording the maximum radius of a well flow conductor bore comprising
    an articulated housing having a plurality of pivotally connected segments, including:
    a first segment:
    a plurality of feeler means housed therein and extendable radially therefrom engagable with the bore wall of said well flow conductor, and
    resilient urging means associated with each of said feeler means, each feeler means being independently extendable to sense a variation in the radius of said well flow conductor bore wall;
    a second segment:
    recording means housed therein responsive to extension of said each feeler means sensing said variations in the radius of said well flow conductor bore wall,
    chart means associated with said recording means for graphically recording said sensed variation in the radius of said well flow conductor bore wall,
    a lead screw axially traversing said second segment and extending into a portion of said first segment, the recording means being carried on said lead screw,
    the portion of said lead screw just entering said first segment being flexible whereby bending of said articulated housing occurring at the junction of said first and second segments causes bending of said portion of said lead screw, and
    a drive frame for rotating said recording means; and
    drive means operably connected to said drive frame and engageable with the bore wall of said well flow conductor, for driving said drive frame as the caliper moves in a direction toward the entry point of the well flow conductor.

2. The TFL caliper of claim 1, wherein said articulated housing is adapted to traverse a five-foot minimum radius bend in said well flow conductor.

3. The TFL caliper of claim 1, wherein said segments are connected each to the other by knuckle joints.

4. The TFL caliper of claim 1, including
    a plurality of first resilient urging means, one of said plurality associated with each of said feeler means, each feeler means being independently extendable radially from said first segment to sense an increase in the radius of said well flow conductor bore, and
    a single second resilient urging means associated with said plurality of first resilient urging means to provide an equal biasing to each of said plurality of first resilient urging means.

5. The TFL caliper of claim 1, including dampening means acting on said recording means to dampen the sensed increase in the radius of said well flow conductor bore wall.

6. A through the flow line caliper for measuring the maximum radius of a well flow conductor bore comprising:
    an articulated housing having a plurality of pivotally connected segments,
    a plurality of feeler means disposed in said articulated housing engageable with the bore wall of said well flow conductor, each individually urgable radially from said articulated housing means,
    resilient urging means engaged with each of said feeler means,
    feeler centering means engagable with said feeler means contacting the feeler means which are least extended radially from said housing means wherein said housing means is maintained in an essentially centered position with respect to the bore wall of the well flow conductor, the feelers, resilient urging means and feeler centering means being housed in a first segment of said articulated housing, recording means, housed in a second segment of said articulated housing which is connected to said first segment, for recording radial movement of at least one of said feeler means, including a stylus member, means for recording movement of said stylus member, a lead screw, having a major portion of its length threaded, axially aligned and essentially centered in said second segment for carrying said stylus member, a drive frame engaged with said stylus member for rotating said stylus member whereby threads on said stylus member, engaged with matching threads on said lead screw, cause said stylus member to be moved axially within said second segment, a segment of said lead screw extending into said first segment of said articulated housing and being connected to a stylus rod housed therein, said stylus rod being longitudinally responsive to radial movement of at least one of said feeler means away from said articulated housing, a portion of said lead screw segment being flexible, and drive means connected to said second segment of said articulated housing, engageable with the bore wall of said well flow conductor, for driving said drive frame as the caliper moves in a direction toward the entry point of the well flow conductor.

* * * * *